(12) United States Patent  
Richardson et al.

(10) Patent No.: US 9,756,140 B2  
(45) Date of Patent: Sep. 5, 2017

(54) TRACKING USER BEHAVIOR RELATIVE TO A NETWORK PAGE

(71) Applicant: Amazon Technologies, Inc., Seattle, WA (US)

(72) Inventors: Jared L. Richardson, Redmond, WA (US); Siddharth Sriram, Seattle, WA (US); Logan Luyet Dillard, Seattle, WA (US); Eric B. Fox, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/568,405

(22) Filed: Dec. 12, 2014

(65) Prior Publication Data

US 2015/0100688 A1    Apr. 9, 2015

Related U.S. Application Data

(63) Continuation of application No. 13/230,153, filed on Sep. 12, 2011, now Pat. No. 8,914,496.

(51) Int. Cl.
| | |
|---|---|
| *H04L 29/08* | (2006.01) |
| *G06Q 30/02* | (2012.01) |
| *G06F 17/30* | (2006.01) |
| *G06N 5/04* | (2006.01) |
| *H04L 12/26* | (2006.01) |

(52) U.S. Cl.
CPC ........ *H04L 67/22* (2013.01); *G06F 17/30861* (2013.01); *G06N 5/04* (2013.01); *G06Q 30/02* (2013.01); *G06Q 30/0242* (2013.01); *G06Q 30/0255* (2013.01); *H04L 43/08* (2013.01); *H04L 67/025* (2013.01)

(58) Field of Classification Search
CPC ....... H04L 67/02; H04L 67/025; H04L 67/22; H04L 67/30; H04L 63/168; H04L 63/0248; G06F 11/30; G06F 11/34; G06F 11/3409; G06F 11/3466; G06F 17/30861; G06F 17/30873; G06Q 30/0255; G06Q 30/02; G06Q 30/0601
See application file for complete search history.

(56) References Cited

U.S. PATENT DOCUMENTS

| | | | |
|---|---|---|---|
| 5,848,396 A | 12/1998 | Gerace | |
| 6,199,067 B1 | 3/2001 | Geller | |
| 6,460,036 B1 | 10/2002 | Herz | |
| 6,763,379 B1 * | 7/2004 | Shuster | ......................... 709/224 |
| 6,934,750 B2 | 8/2005 | Hijikata et al. | |
| 7,000,242 B1 * | 2/2006 | Haber | ................ G06Q 30/0246 715/719 |

(Continued)

*Primary Examiner* — Ramy M Osman  
(74) *Attorney, Agent, or Firm* — Thomas | Horstemeyer, LLP

(57) ABSTRACT

Disclosed are various embodiments for tracking user behavior relative to a network page and identifying user interest in various content items of the network page according to the user behavior. A network page that includes multiple content items is rendered for display in a client. A user action is obtained relative to the network page. A user behavior report is sent to one or more servers. The user behavior report indicates the user action, a timestamp associated with the user action, and one or more of the content items that are associated with the user action.

20 Claims, 9 Drawing Sheets

(56) References Cited

U.S. PATENT DOCUMENTS

| | | | |
|---|---|---|---|
| 7,028,001 B1* | 4/2006 | Muthuswamy | G06Q 30/02 705/14.73 |
| 7,523,191 B1 | 4/2009 | Thomas et al. | |
| 7,631,007 B2 | 12/2009 | Morris | |
| 7,631,032 B1 | 12/2009 | Refuah et al. | |
| 7,941,525 B1 | 5/2011 | Yavilevich | |
| 8,126,962 B1* | 2/2012 | Schnedler | H04L 12/4633 709/203 |
| 8,190,452 B2* | 5/2012 | Vasko et al. | 705/3 |
| 8,255,514 B2 | 8/2012 | DeHaas et al. | |
| 8,626,911 B2 | 1/2014 | Konig et al. | |
| 8,914,496 B1* | 12/2014 | Richardson | H04L 43/08 709/203 |
| 9,607,325 B1* | 3/2017 | Sriram | G06Q 30/0282 |
| 9,654,541 B1* | 5/2017 | Kapczynski | H04L 67/02 |
| 2002/0112048 A1 | 8/2002 | Gruyer et al. | |
| 2002/0133565 A1* | 9/2002 | Huat | G06Q 30/02 709/218 |
| 2002/0164564 A1* | 11/2002 | Fretwell, Jr. | 434/188 |
| 2003/0101449 A1 | 5/2003 | Bentolila et al. | |
| 2003/0144898 A1 | 7/2003 | Bibelnieks et al. | |
| 2006/0036565 A1 | 2/2006 | Bruecken | |
| 2006/0230058 A1 | 10/2006 | Morris | |
| 2006/0248110 A1* | 11/2006 | Lynn et al. | 707/102 |
| 2007/0150355 A1 | 6/2007 | Meggs | |
| 2007/0266311 A1 | 11/2007 | Westphal | |
| 2008/0114875 A1* | 5/2008 | Anastas et al. | 709/224 |
| 2008/0163065 A1* | 7/2008 | Vartiainen | G06F 17/30887 715/738 |
| 2008/0215966 A1 | 9/2008 | Suarez | |
| 2008/0306794 A1* | 12/2008 | Cohen | G06Q 30/02 705/7.31 |
| 2009/0132559 A1 | 5/2009 | Chamberlain et al. | |
| 2009/0146775 A1 | 6/2009 | Bonnaud et al. | |
| 2009/0327076 A1 | 12/2009 | Sinyagin et al. | |
| 2010/0094706 A1* | 4/2010 | Gabai | G06Q 30/0255 705/14.53 |
| 2010/0095208 A1* | 4/2010 | White et al. | 715/704 |
| 2010/0153379 A1 | 6/2010 | Cormode et al. | |
| 2010/0235642 A1* | 9/2010 | Ota | H04L 63/168 713/175 |
| 2011/0161825 A1* | 6/2011 | Tierney | G06F 11/3672 715/736 |
| 2011/0219115 A1 | 9/2011 | Capel et al. | |
| 2012/0278484 A1 | 11/2012 | Westphal | |
| 2013/0031470 A1 | 1/2013 | Daly, Jr. et al. | |
| 2013/0132833 A1 | 5/2013 | White et al. | |

* cited by examiner

E-Retailer – Reviews of Sanaponic LMX Camera – Web Browser _ 🗗 X

File   Edit   View   Bookmarks   Tools   Help

< >   http://www.e-retailer.site/customer_reviews/sanaponic_lmx_camera

Review 3:                                                                                      ← 154c
This camera was a gift for my wife who has a very nice camera (a Lony about a half-
step below a professional camera) which she uses most of the time. She wanted
something small that she could stick in her pocket for those spur of the moment
occasions that crop up at children's school parties and such. This camera fits the bill.

Review 4:                                                                                      ← 154d
Santa gave this camera to my daughter for Christmas just 7 months ago. Today,
while taking the batteries out to replace them, two small screws came out as well.
We cannot find where the screws came from and the camera no longer works. I only
hope that Sanaponic will replace the camera, but I have my doubts. It's a cute
camera and the price is perfect, but you would certainly hope a camera would last
more than a few months.

Review 5:                                                                                      ← 154e
This camera took pretty good pictures for about a month, but then it broke. I think
the mechanism that slides the lens forward is stuck because when we try to turn it
on, the display lights up, the camera makes a few honking sounds, and then it shuts
down. [Although it does take movies, it's a pain to switch to video mode] The video
option is the last item under a settings menu that has multiple pages--if you don't
know there are multiple pages, you might never find this option.              —203c Review 6:              —206                                                                    ← 154f
Bought it to replace my grown daughter's lost camera. It wouldn't work straight out of
the package. Inside pictures too dark. Outside pictures too bright. In between came
out with green and blue blocks and looked like cartoons. As soon as she gives it
back its being returned for credit.

Review 7:                                                                                      ← 154g
Bought this camera for my wife and she loved it. Picture quality was great.
You can't go wrong if you're thinking about buying this.

Review 8:                                                                                      ← 154h
I bought this as a birthday gift for my sister. I bought it because of the price. It didn't
last. After about a month and a half of use it stopped working. She is having the 169b

FIG. 2D

TRACKING USER BEHAVIOR RELATIVE TO A NETWORK PAGE

CROSS-REFERENCE TO RELATED APPLICATION

This application is a continuation of, and claims priority to, co-pending U.S. patent application entitled "TRACKING USER BEHAVIOR RELATIVE TO A NETWORK PAGE," filed on Sep. 12, 2011, and assigned application Ser. No. 13/230,153, which is incorporated herein by reference in its entirety.

BACKGROUND

When browsing network content, a user may request and view numerous different network pages. However, the user may quickly identify many of the network pages as irrelevant. Further, relevant network pages may include irrelevant content.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 2A-2E are drawings of examples of user interfaces rendered by a client in the networked environment of FIG. 1 according to various embodiments of the present disclosure.

DETAILED DESCRIPTION

The present disclosure relates to tracking various forms of user behavior relative to a network page. As an example, the user will scroll down to below-the-fold content as the user reads content on a network page. How long a user pauses with the viewport of the browser being in a selected scrolling condition may indicate the interest of the user in the content of the network page that is currently rendered in the viewport. As another example, some users may be in the habit of tracking what they read or look at using their mouse cursor. Thus, where the mouse cursor moves over rendered content of a network page may define user interest in various objects such as, for example, text, buttons, images, etc. As yet another example, if a user copies certain text from a rendered network page, it may be inferred that the user is interested in that particular text and perhaps more so than non-copied text from the network page.

Various embodiments of the present disclosure facilitate tracking of scrolling, mouse cursor movement, copy actions, and/or other forms of user behavior relative to a network page. Data indicating the user behavior is reported to a server. The user behavior data may be filtered to exclude irrelevant user behavior and then further analyzed. Analysis of the user behavior data may be employed to determine highly relevant portions of the network page content for emphasis, tagging, extraction, and/or other uses. In the following discussion, a general description of the system and its components is provided, followed by a discussion of the operation of the same.

Figure 1:
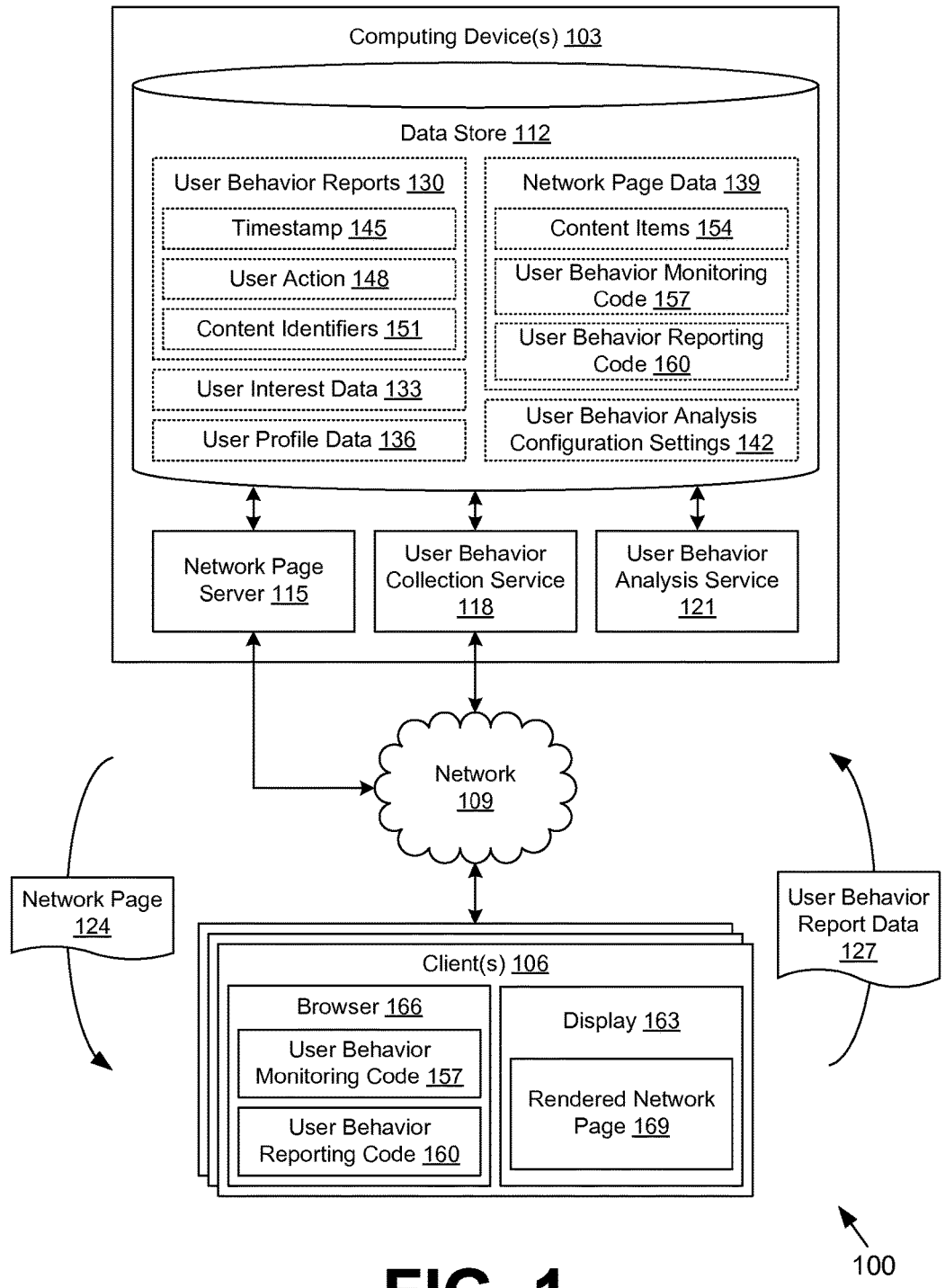
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a network page server 115, a user behavior collection service 118, a user behavior analysis service 121, and other applications, services, processes, systems, engines, or functionality not discussed in detail herein. The network page server 115 is executed to generate and serve up various network pages 124 to clients 106 by way of the network 109. The network pages 124 may correspond to web pages, gopher pages, mobile application screens, and/or other forms of network content. The network page server 115 may, for example, serve up network pages 124 associated with one or more online retailers and may facilitate electronic commerce. In various embodiments, the network page server 115 may include a commercially available hypertext transfer protocol (HTTP) server such as Apache® HTTP Server, Apache® Tomcat®, Microsoft® Internet Information Services (IIS), and so on.

The user behavior collection service 118 is executed to obtain user behavior report data 127 from clients 106 by way of the network 109. The user behavior collection service 118 is configured to store the user behavior report data 127 in the data store 112. The user behavior analysis service 121 is executed to process and analyze the user behavior report data 127 to identify user interests and aggregate user interests in content items embedded within network pages 124 based at least in part on user behavior relative to the network pages 124.

The data stored in the data store 112 includes, for example, user behavior reports 130, user interest data 133, user profile data 136, network page data 139, user behavior analysis configuration settings 142, and potentially other data. The user behavior reports 130 correspond to user behavior report data 127 that has been collected from a plurality of clients 106 and stored in the data store 112. Each of the user behavior reports 130 may include, for example, a timestamp 145, a user action 148, one or more content identifiers 151, and/or other data. The timestamp 145 may identify a point in time at which the user behavior report 130 was generated in the client 106. The timestamp 145 may identify an actual time or a relative time. In some cases, the timestamp 145 may merely be a sequence number used for ordering the user behavior reports 130.

The user action 148 may identify a type of action performed by the user relative to content items of a network page 124. For example, the user action 148 may correspond to a scrolling action, a hovering action, a selection action, a copying action, a zooming action, and/or other action. The content identifiers 151 may uniquely identify one or more content items in the network page 124 that are associated with the user action 148. As a non-limiting example, if a user hovers over a sentence, the content identifiers 151 may include a unique identifier of the paragraph, a unique identifier of the sentence, unique identifiers of each word in the sentence, etc.

The user interest data 133 indicates identified user interests (individual and/or aggregate) in various content items of network pages 124. To this end, the user interest data 133 may also include content identifiers 151 that are associated with the identified user interests. In some embodiments, the network page server 115 may be configured to generate the network pages 124 such that content items in which users are interested are emphasized, featured, highlighted, and/or otherwise given prominence in the network page 124. In some embodiments, the network page server 115 may be configured to generate the network pages 124 such that relatively low interest content items 154 are deemphasized or omitted from the network page 124.

The user profile data 136 includes profiling information that is associated with individual users. As a non-limiting example, it may be the case that a user is in the habit of mousing over text while reading it. If so, the user behavior reports 130 indicating hovering over text in a network page 124 may be useful in determining user interest. By contrast, other users may not be in a similar habit, and mouse movements may be determined to be random. After collection of a number of user behavior reports 130 for a user, the user behavior analysis service 121 may configure the profile of a user in the user profile data to denote whether the user has the particular mousing-over-text habit. As another non-limiting example, the user profile data 136 may identify an estimated distance between a mouse cursor performing a hovering action and an actual location of user attention, which may vary among users. To illustrate, a user may have a mousing-over-text habit but be consistently mousing over text one line below where the user is actually reading. Accordingly, the user profile data 136 may be employed as heuristic data to aid the user behavior analysis service 121 in analyzing subsequent user behavior reports 130.

The network page data 139 corresponds to data that may be used by the network page server 115 and other applications to generate the network pages 124. The network page data 139 may include, for example, templates, scripts, source images, etc. The network page data 139 may also include content items 154, user behavior monitoring code 157, user behavior reporting code 160, and/or other data. The content items 154 may correspond to any items of content that may be included in a network page 124 such as, for example, letters, words, phrases, sentences, paragraphs, images, graphics, applets, video, user interface components, groupings of other items of content, and so on. In particular, a content item 154 (or collection of content items 154) may be assigned a content identifier 151 to uniquely identify the content item 154 in the user behavior reports 130. In some cases, a content item 154 may be assigned a content identifier 151 that identifies a grouping of content items 154.

The user behavior monitoring code 157 corresponds to code that may be executed in a client 106 to perform tracking of user actions 148 as will be described. The user behavior reporting code 160 corresponds to code that may be executed in a client 106 to perform reporting of the user behavior report data 127 as generated by the user behavior monitoring code 157. In various embodiments, the user behavior monitoring code 157 and the user behavior reporting code 160 may correspond to browser plug-ins, JavaScript, VBScript, Java, and/or other forms of code that may be executed in the client 106 in connection with a network page 124.

The user behavior analysis configuration settings 142 include various parameters that govern the analysis of the user behavior reports 130 by the user behavior analysis service 121. For example, the user behavior analysis configuration settings 142 may include one or more parameters that configure when a user behavior report 130 is to be disregarded as reflecting random data rather than user attention. To illustrate, a user may be scrolling with the scroll wheel on the mouse instead of dragging a scroll bar, which would result in a purely vertical movement by the mouse cursor, with no horizontal displacement. The user behavior analysis configuration settings 142 may specify that user behavior reports 130 corresponding to such mouse movement may be ignored. Additionally, the user behavior analysis configuration settings 142 may configure timeout parameters that govern whether a user is interpreted to be paying attention for an extended time (e.g., closely reading the network page 124 and not generating user input, etc.) versus assuming that the user is no longer paying attention (e.g., leaving the room and not generating user input, etc.).

The user behavior analysis configuration settings 142 may also define different weighting systems that depend on the type of client 106. For example, the content items 154 that are currently displayed on a screen of a client 106 may be a stronger indication of user interest when the client 106 is a mobile device with a relatively small display area in comparison to a client 106 that is a desktop computer with a relatively large display area.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 163. The display 163 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 166 and/or other applications. The browser 166 may be executed in a client 106, for example, to access and render network pages 124, such as web pages, or other network content served up by the computing device 103 and/or other servers, thereby generating a rendered network page 169 on the display 163. The browser 166 may be configured to execute the user behavior monitoring code 157 and/or the user behavior reporting code 160 which may be downloaded along with or otherwise referenced by network pages 124. The client 106 may be configured to execute applications beyond the browser 166 such as, for example, mobile applications, email applications, instant message applications, and/or other applications.

Next, a general description of the operation of the various components of the networked environment 100 is provided. To begin, a user at a client 106 requests a network page 124 from the network page server 115 over the network 109. The network page 124 is generated and sent to the browser 166 for rendering as the rendered network page 169 on the display 163. The network page 124 includes multiple content items 154 that may be tracked by unique identifiers. The network page 124 may include user behavior monitoring code 157 and user behavior reporting code 160 to track user behavior relative to the rendered network page 169 and report the user behavior to the user behavior collection service 118 as user behavior report data 127.

Various forms of user behavior relative to a rendered network page 169 include, for example, scrolling, zooming, hovering, selecting, copying, and so on. The user behavior may be relevant in assessing whether a user is interested in a given content item 154 on the rendered network page 169. The content items 154 may be any portion of content on the rendered network page 169, such as words, sentences, paragraphs, images, components, etc. The network page 124 may associate the content items 154 with corresponding content identifiers 151 by way of "name" attributes, "id" attributes, "div" elements, "span" elements, and/or other approaches in hypertext markup language (HTML), extensible markup language (XML), JavaScript, and other languages.

When a user performs a user action 148 relative to one or more of the content items 154, the user behavior monitoring code 157 may record the behavior along with one or more timestamps 145 indicating the absolute time, length of time, relative time, etc. of the behavior. The user behavior reporting code 160 in the client 106 then may report the behavior and the type of client 106 to the user behavior collection service 118 in the computing device 103. In one embodiment, the reporting is performed immediately, responsive to the detection of the user behavior. In another embodiment, reporting may be delayed to ensure a minimum time interval between reports or a minimum number of user actions 148. Depending on the user behavior and characteristics of the user, some user behavior may be unreported to the user behavior collection service 118.

The user behavior analysis service 121 may then perform analysis on the user behavior reports 130 to identify a user interest in one or more of the content items 154 on the rendered network page 169. The user behavior analysis service 121 may analyze the user behavior reports 130 from a multitude of clients 106 and users to determine aggregate user interest in one or more of the content items 154. To this end, the user behavior analysis service 121 may generate an interest score for each of the content items 154 from the user behavior reports 130. Certain types of user actions 148 may be weighted more heavily than others. The timestamps 145 may indicate a length of time which may be correlated with a level of interest.

Also, it may be determined whether a user behavior report 130 represents user attention or inattention, e.g., whether the user is lingering for a long time in connection with a content item 154 or has left the room and is inattentive to the content item 154. User behavior reports 130 that are not predicted to indicate a user interest may be filtered or excluded from consideration.

Additionally, information may be gathered about the browsing habits of particular users that may be helpful in identifying user interests in content items 154. As a non-limiting example, a user may be in the habit of hovering over content items 154 while reading them. However, the mouse cursor of the user may be hovering below the actual content items 154 that are being read. Thus, the user interest "credit" should be applied to the content items 154 above the mouse cursor, not directly under the mouse cursor.

In such a case, an estimated distance between the mouse cursor performing the hovering action and an actual location of user attention may be calculated. In one embodiment, the estimated distance may be estimated when a user selects a button or other component that is in line with the read content. If the mouse cursor is tracking below the actual read content, the mouse cursor may jump suddenly to a button or other component in line with the actual read content. The distance may be determined (e.g., one line, 15 pixels, etc.) and employed as the estimated distance. The estimated distance and/or other user-specific parameters may be stored in the user profile data 136 to aid analysis.

The analysis of user behavior may depend at least in part on the type of client 106. While a hovering action with a laptop or desktop computer may indicate an interest in content relative to the hovering, it may be unlikely to indicate interest with a smartphone or other mobile device with a touchscreen. It may be that the user is not reading text underneath a cursor on a touchscreen because the finger of the user may obscure the text around the cursor. Thus, the user behavior analysis service 121 may determine less user interest or even user disinterest in content items 154 around the cursor.

Also, because a client 106 that is a mobile device may have a much smaller screen than a desktop or laptop computer, what is currently shown on the display 163 by way of scrolling or zooming may be a relatively significant indicator of user interest. For example, a rendered network page 169 may initially, or after rotation of the mobile device, correspond to an illegibly small view of a network page 124 on the display 163 of a mobile device. The user may then zoom in on areas of interest, thereby updating what is shown in the rendered network page 159. The zoomed-in portions may be interpreted as indicating user interest. Furthermore, actions such as copying may be stronger indicator of user interest on a mobile platform.

In some embodiments, a client 106 (e.g., a smartphone, etc.) may have an accelerometer. The accelerometer may be used to determine when the client 106 is in motion. Consequently, it may be inferred in some situations that a user may not be paying attention to what is shown on the display 163 when the client 106 is in motion. To this end, the user behavior monitoring code 157 may report data derived from the accelerometer to the user behavior collection service 118 for use in analysis. The user behavior monitoring code 157 may also or instead perform filtering on user behavior report data 127 if it is determined that the client 106 is in motion. Although the specific example of an accelerometer is described above, it is understood that clients 106 may have other hardware components that may provide information useful to the determination of user attention or inattention.

Figure 2A:
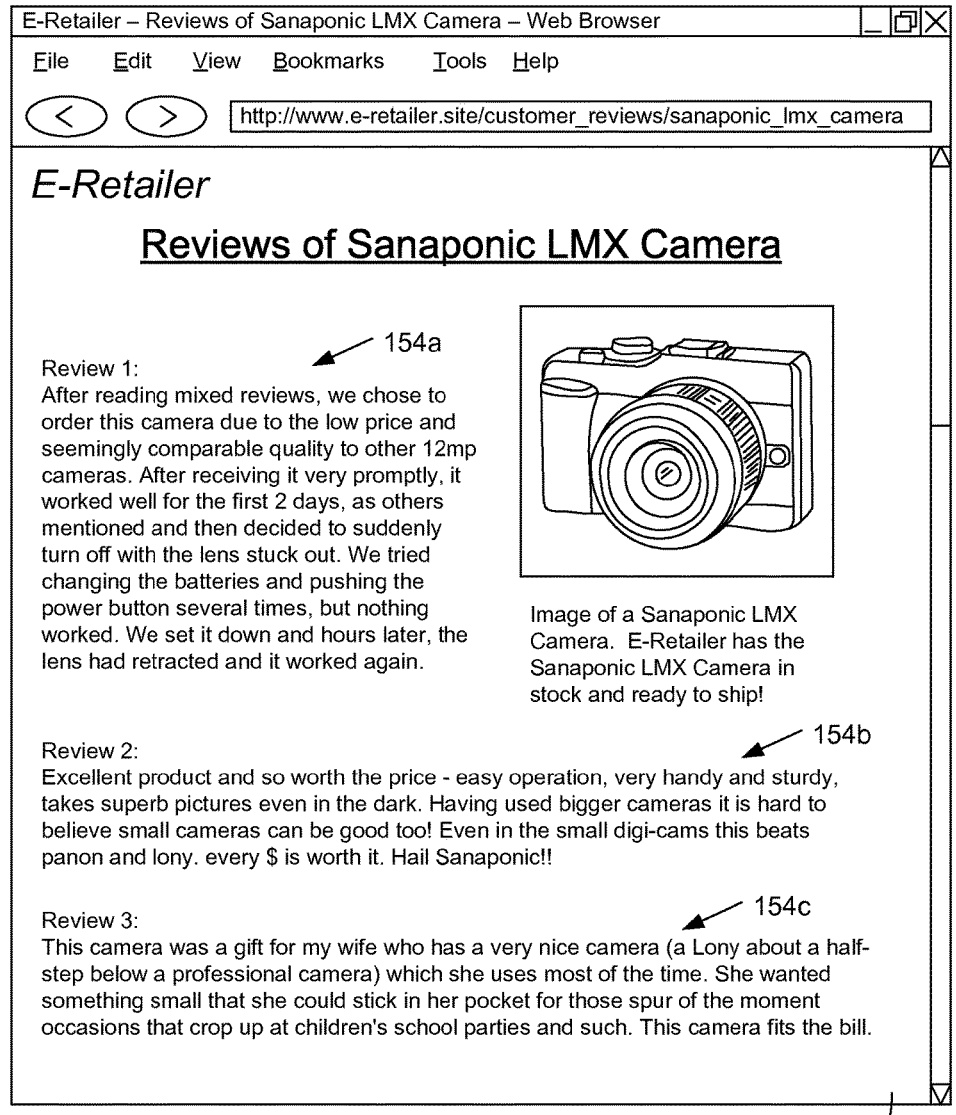

Referring next to FIG. 2A, shown is one example of a rendered network page 169a that is rendered by a browser 166 (FIG. 1) executed in a client 106 (FIG. 1) in the networked environment 100 (FIG. 1). In this non-limiting example, the rendered network page 169a corresponds to a network page 124 (FIG. 1) that contains customer reviews about a product offered for sale through a network site served up by the network page server 115 (FIG. 1). The example of FIG. 2A corresponds to the initially rendered version of the network page 124, with additional content being accessible below-the-fold.

The rendered network page 169a includes a plurality of content items 154a, 154b, and 154c, corresponding to respective customer reviews of the product. In various embodiments, other elements of the rendered network page 169a may be regarded as content items 154 and each customer review may be regarded as comprising a respective content item 154 for each letter, word, sentence, paragraph, or other subdivision of the customer review.

Figure 2B:
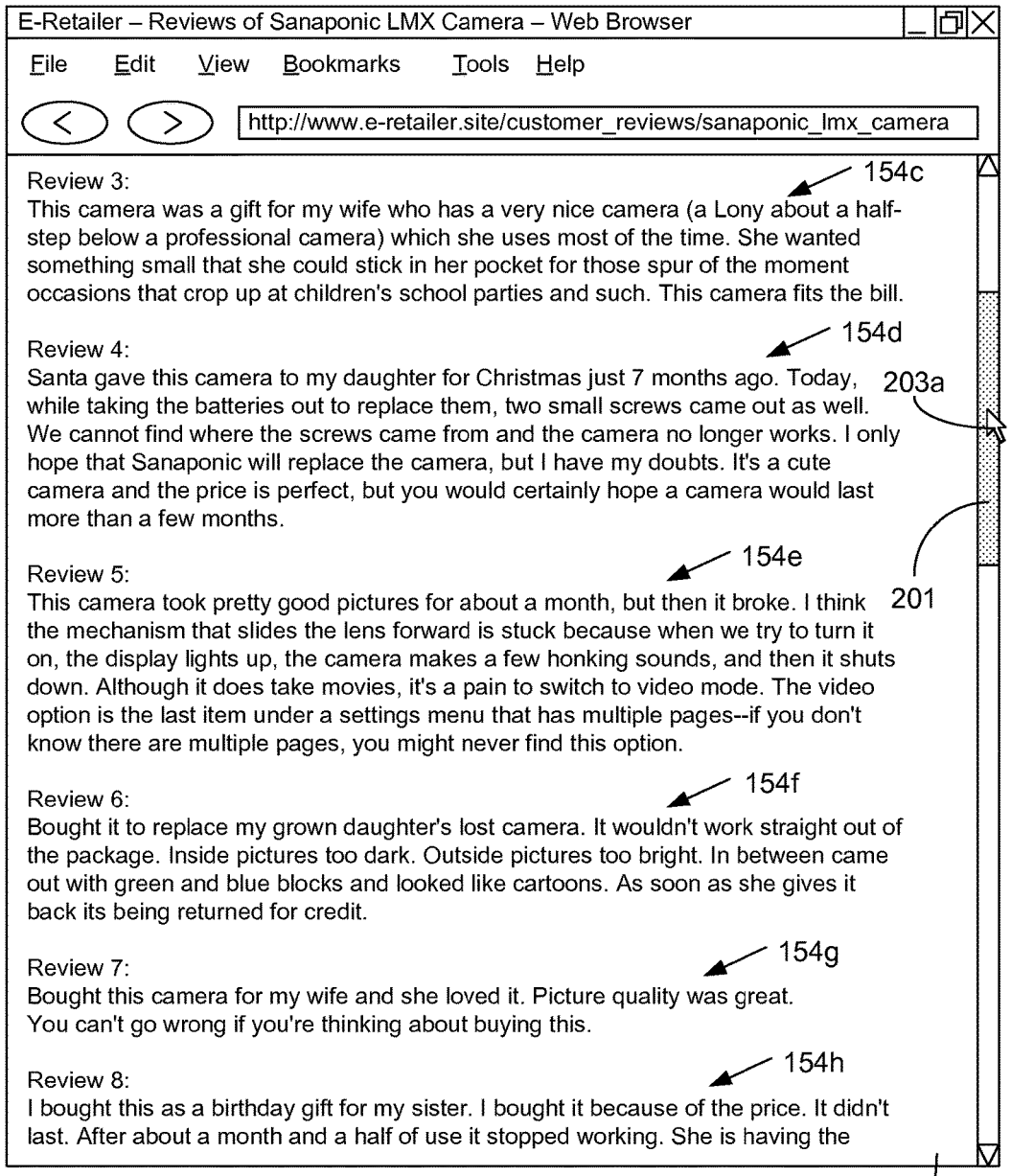

Turning now to FIG. 2B, shown is another example of a rendered network page 169b that is rendered by a browser 166 (FIG. 1) executed in a client 106 (FIG. 1) in the networked environment 100 (FIG. 1). The example of FIG. 2B corresponds to a version of the rendered network page 169a (FIG. 2A) that has been scrolled downward. Specifically, the user has manipulated a scrollbar 201 with a cursor 203a to scroll the viewport of the browser 166 downward, exposing some previously unseen content and obscuring some previously seen content. It is noted that a user may scroll by way of a scrolling wheel in a mouse or other input device, using the arrow keys on the keyboard, and/or by other approaches with the same result.

As shown, the scrolling direction is the same direction as that of the motion of the cursor 203a and scrollbar 201. However, it is noted that scrolling in some clients 106 may happen in a direction opposite of the motion of the cursor 203a or scrollbar 201. For example, clicking on the rendered network page 169a and dragging in a vertical direction may result in scrolling of the rendered network page 169a downward. In the rendered network page 169b, the content items 154c, 154d, 154e, 154f, 154g and 154h are visible (content item 154h is at least partially visible), while content items 154a and 154b (FIG. 2A) are now hidden.

While the scrollbar 201 is moved, or after the scrollbar 201 is stopped after having been moved, one or more user behavior reports 130 (FIG. 1) may be generated in the browser 166 and sent to the user behavior collection service 118. The user action 148 (FIG. 1) in this case may correspond, for example, to beginning scrolling, scrolling in progress, or stopping scrolling. A timestamp 145 may, for example, record when the scrollbar 201 begins moving and/or when it stops moving. The content identifiers 151 (FIG. 1) associated with the visible content items 154c, 154d, 154e, 154f, 154g and 154h may be included in the user behavior report 130. Alternatively, the content identifiers 151 may be inferred based at least in part on the network page 124 (FIG. 1) and a specification of what portion of the network page 124 is visible as the rendered network page 169b.

If the user scrolls down and lingers for a relatively long time over a certain subset of content items 154, the user behavior analysis service 121 (FIG. 1) may infer that the user is particularly interested in the subset of the content items 154. However, the level of interest may be uncertain. For example, the user may be focused on the customer review corresponding to content item 154e and ignoring the rest. Consequently, the user behavior analysis service 121 may give scrolling-related user actions 148 less weight in assessing user interest.

Figure 2C:
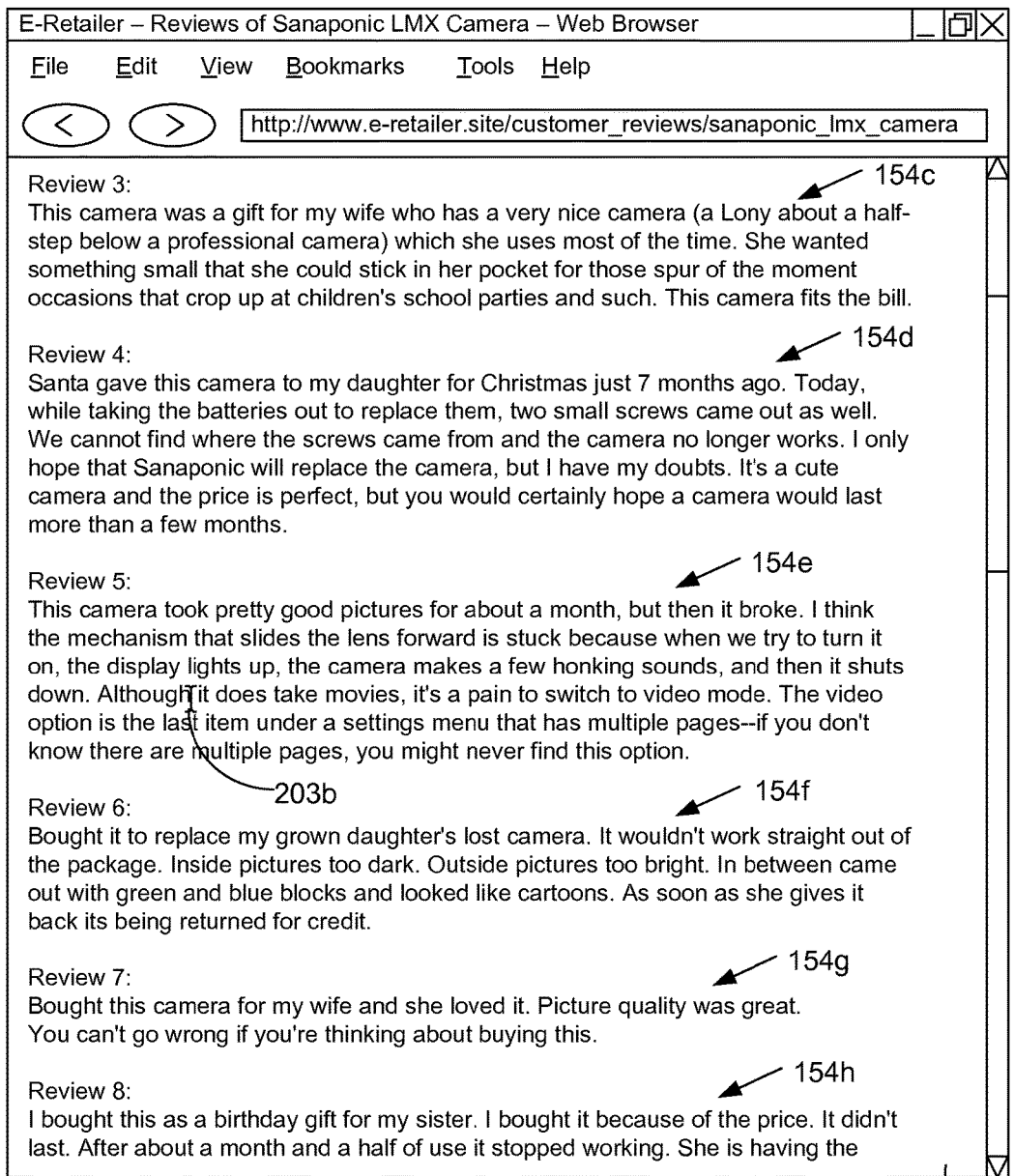

Moving on to FIG. 2C, shown is another example of the rendered network page 169b that is rendered by a browser 166 (FIG. 1) executed in a client 106 (FIG. 1) in the networked environment 100 (FIG. 1). In FIG. 2C, the user has moved the cursor 203b so as to hover over the content item 154e. Accordingly, a user behavior report 130 (FIG. 1) may be generated in the browser 166 and sent to the user behavior collection service 118 (FIG. 1), where the user behavior report 130 identifies the user action 148 (FIG. 1) as a hovering action and the content identifier 151 (FIG. 1) corresponds to the content item 154e.

Based at least in part on the timestamp 145 (FIG. 1), the user profile data 136 (FIG. 1), the user behavior analysis configuration settings 142 (FIG. 1), other user behavior reports 130, etc., the user behavior analysis service 121 (FIG. 1) may determine whether the hovering action depicted in FIG. 2C will be included or excluded in determining whether a user interest exists. The user may have randomly left the cursor 203b at the depicted location and scrolled downward using a mouse scroll wheel. Such an action does not indicate a heightened level of user interest in the content item 154e compared to other content items 154 shown in the rendered network page 169b.

Alternatively, the user may have a habit of actively tracking where the user is reading with the cursor 203b. If so, the placement of the cursor 203b relative to the content item 154e may indicate a heightened level of user interest in the particular content item 154e. The time spent hovering over the content item 154e may also indicate a level of user interest. Since the hovering action may indicate an explicit interest in the particular content item 154e, the user behavior report 130 for hovering may be given a greater weight in assessing user interest compared to scrolling the content item 154e into view.

Turning now to FIG. 2D, shown is another example of the rendered network page 169b that is rendered by a browser 166 (FIG. 1) executed in a client 106 (FIG. 1) in the networked environment 100 (FIG. 1). In FIG. 2D, the user has used the cursor 203c to create a selection 206 of a sentence in the content item 154e. The sentence itself may correspond to a respective content item 154. Accordingly, a user behavior report 130 (FIG. 1) may be generated in the browser 166 and sent to the user behavior collection service 118 (FIG. 1), where the user behavior report 130 identifies the user action 148 (FIG. 1) as a selection action and the content identifier 151 (FIG. 1) corresponds to the selection 206.

Because the selection 206 may be more likely to involve an active user behavior with respect to content items 154 in the rendered network page 169, the user behavior analysis service 121 (FIG. 1) may be configured to give a relatively greater weight to user behavior reports 130 involving selection user actions 148. This weight may be greater than that given to other user actions 148 that may be less correlated with user interest such as, for example, scrolling, hovering, etc.

Figure 2E:
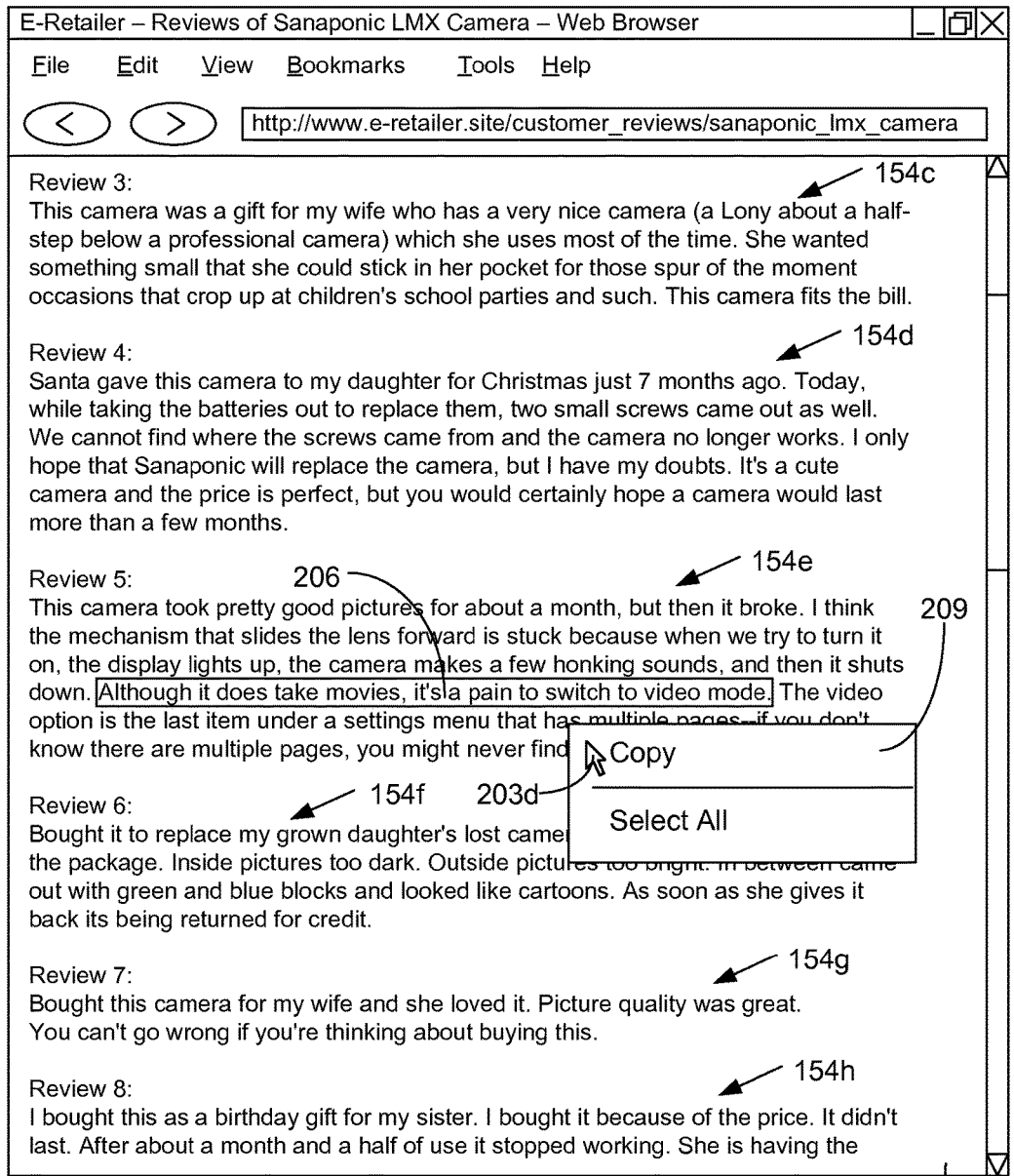

Continuing now to FIG. 2E, shown is yet another example of the rendered network page 169b that is rendered by a browser 166 (FIG. 1) executed in a client 106 (FIG. 1) in the networked environment 100 (FIG. 1). In FIG. 2E, the user has made the selection 206 of a sentence as in FIG. 2D. In FIG. 2E, however, the user has also performed a copying action through a copy menu 209 with a cursor 203d. A copying action may also be initiated through keyboard shortcuts (e.g., control-c, etc.), window title bar menus, and so on. Accordingly, a user behavior report 130 (FIG. 1) may be generated in the browser 166 and sent to the user behavior collection service 118 (FIG. 1), where the user behavior report 130 identifies the user action 148 (FIG. 1) as a copying action and the content identifier 151 (FIG. 1) corresponds to the selection 206.

The user behavior analysis service 121 may be configured to give an even greater weight to the user behavior report 130 involving a copying user action 148 than to user actions 148 relating to selecting, hovering, scrolling, etc. It may be inferred that the user is interested enough in the content such that the user is prepared to copy the content and use it elsewhere in the client 106. Thus, such a user behavior report 130 may be strongly weighted.

Figure 3:
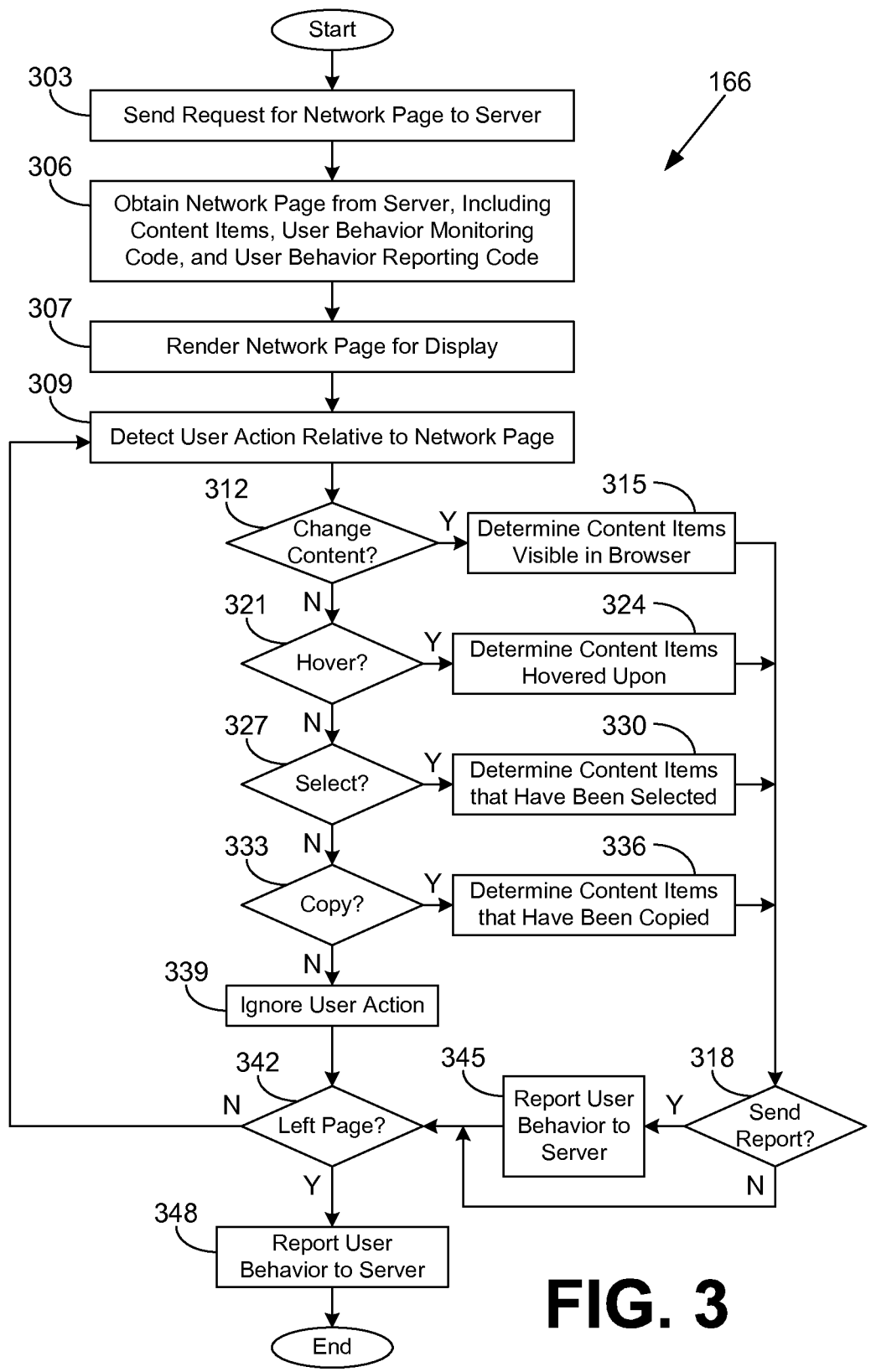
FIG. 3 is a flowchart illustrating one example of functionality implemented as portions of a browser executed in a client in the networked environment of FIG. 1 according to various embodiments of the present disclosure.

Referring next to FIG. 3, shown is a flowchart that provides one example of the operation of a portion of the browser 166 according to various embodiments. It is understood that the flowchart of FIG. 3 provides merely an example of the many different types of functional arrangements that may be employed to implement the operation of the portion of the browser 166 as described herein. As an alternative, the flowchart of FIG. 3 may be viewed as depicting an example of steps of a method implemented in the client 106 (FIG. 1) according to one or more embodiments.

Beginning with box 303, the browser 166 sends a request for a network page 124 (FIG. 1) to the network page server 115 (FIG. 1). In box 306, the browser 166 obtains the network page 124 from the network page server 115. The network page 124 includes a set of content items 154 (FIG. 1), user behavior monitoring code 157 (FIG. 1), user behavior reporting code 160 (FIG. 1), and/or other data. In some cases, various data of the network page 124 may be obtained from different network page servers 115 which may be hosted on different computing devices 103. Also, some or all of the user behavior monitoring code 157 and/or the user behavior reporting code 160 may be cached or otherwise stored in the client 106.

In box 307, the browser 166 renders the network page 124 for display as a rendered network page 169 (FIG. 1). In box 309, the browser 166, by executing the user behavior monitoring code 157, detects a user action 148 (FIG. 1) relative to the rendered network page 169. In box 312, the user behavior monitoring code 157 determines whether the user action 148 corresponds to an action that results in a change as to which of the content items 154 which are visible in the rendered network page 169. In other words, the action may initiate rendering of a different portion of the rendered network page 169 on the display 163 (FIG. 1). Such user actions 148 may include, for example, scrolling, zooming, or other user actions 148. If the user action 148 corresponds to an action that results in a change as to which of the content items 154 which are visible, the user behavior monitoring code 157 moves to box 315 and determines the content items 154 of the rendered network page 169 that are visible in the browser 166. Thereafter, the browser 166 proceeds to box 318. Otherwise, the user behavior monitoring code 157 proceeds from box 312 to box 321.

In box 321, the user behavior monitoring code 157 determines whether the user action 148 corresponds to a hovering or mousing action. If the user action 148 corresponds to a hovering action, the user behavior monitoring code 157 moves to box 324 and determines the content items 154 of the rendered network page 169 that are hovered upon in the browser 166. Thereafter, the browser 166 proceeds to box 318. Otherwise, the user behavior monitoring code 157 proceeds from box 321 to box 327.

In box 327, the user behavior monitoring code 157 determines whether the user action 148 corresponds to a selection action. If the user action 148 corresponds to a selection action, the user behavior monitoring code 157 moves to box 330 and determines the content items 154 of the rendered network page 169 that have been selected in the browser 166. Thereafter, the browser 166 proceeds to box 318. Otherwise, the user behavior monitoring code 157 proceeds from box 327 to box 333.

In box 333, the user behavior monitoring code 157 determines whether the user action 148 corresponds to a copying action. If the user action 148 corresponds to a copy action, the user behavior monitoring code 157 moves to box 336 and determines the content items 154 of the rendered network page 169 that have been copied in the browser 166. Thereafter, the browser 166 proceeds to box 318. Otherwise, the user behavior monitoring code 157 proceeds from box 333 to box 339.

In box 339, the user behavior monitoring code 157 may ignore the user action 148 if it is not classified under a previous action type. Other types of user actions 148 may be monitored and reported in other embodiments. The user behavior monitoring code 157 then proceeds to box 342.

In box 318, the user behavior reporting code 160 executed in the browser 166 determines whether to send a user behavior report 130 (FIG. 1) corresponding to the user action 148 and/or other previous unreported user actions 148. If the user behavior reporting code 160 is to send a report, the user behavior reporting code 160 continues to box 345 and reports the user behavior to the user behavior collection service 118 (FIG. 1) as user behavior report data 127 (FIG. 1). The report may include an identification of the type of client 106. The user behavior reporting code 160 then continues to box 342. If the user behavior reporting code 160 instead determines that no report is to be sent, the user behavior reporting code 160 moves from box 318 to box 342.

In box 342, the user behavior reporting code 160 determines whether the user has left the rendered network page 169. For example, the user may close the window or tab of the browser 166 corresponding to the rendered network page 169. If the user has not left the rendered network page 169, the browser 166 returns to box 309 and the user behavior monitoring code 157 continues to detect another user action 148 relative to the rendered network page 169. If, instead, the user has left the rendered network page 169, the user behavior reporting code 160 may continue to box 348 and report otherwise unreported user behavior to the user behavior collection service 118. Thereafter, the portion of the browser 166 ends.

Figure 4:
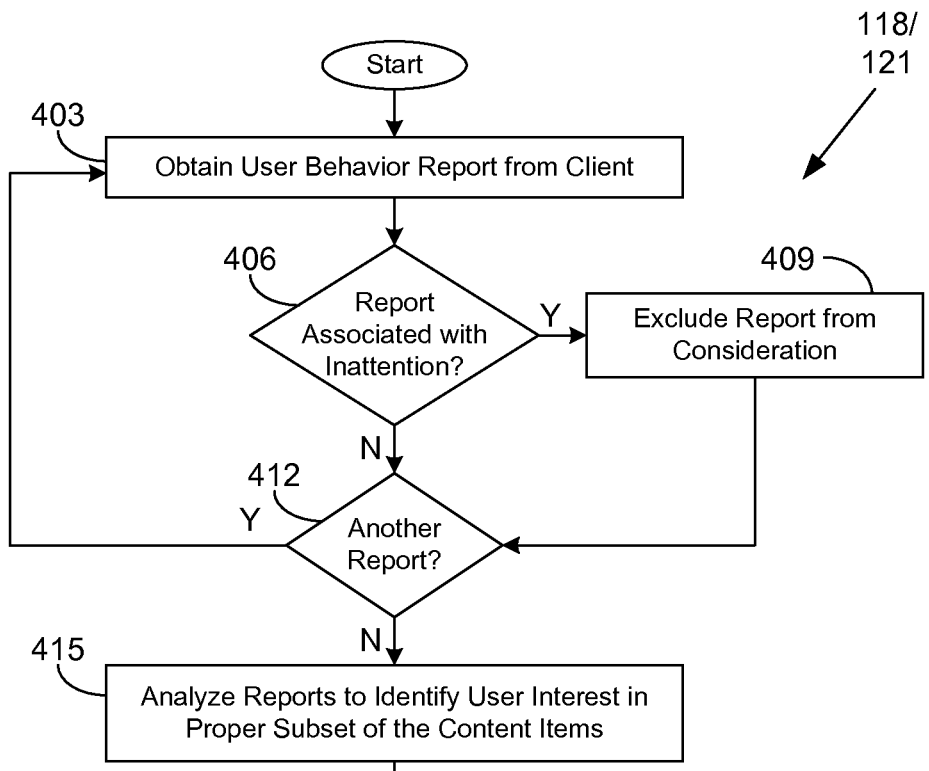
FIG. 4 is a flowchart illustrating one example of functionality implemented as portions of a user behavior collection service and a user behavior analysis service executed in a computing device in the networked environment of FIG. 1 according to various embodiments of the present disclosure.

Turning now to FIG. 4, shown is a flowchart that provides one example of the operation of portions of the user behavior collection service 118 and the user behavior analysis service 121 according to various embodiments. It is understood that the flowchart of FIG. 4 provides merely an example of the many different types of functional arrangements that may be employed to implement the operation of the portions of the user behavior collection service 118 and the user behavior analysis service 121 as described herein. As an alternative, the flowchart of FIG. 4 may be viewed as depicting an example of steps of a method implemented in the computing device 103 (FIG. 1) according to one or more embodiments.

Beginning with box 403, the user behavior collection service 118 obtains user behavior report data 127 (FIG. 1) from the client 106 (FIG. 1). The user behavior collection service 118 may process the user behavior report data 127 and store it as one or more user behavior reports 130 (FIG. 1). Such processing may, for example, reduce the data stored in the user behavior reports 130 and/or facilitate faster access to the data in the user behavior reports 130.

In box 406, the user behavior analysis service 121 determines whether the user behavior report 130 is associated with user inattention. As an example, a user behavior report 130 associated with mouse movement that is purely one dimensional might not indicate user attention relative to the mouse movement. As another example, a user behavior report 130 which might show a user hovering over a content item 154 (FIG. 1) for an extended period of time may either show strong user attention or user inattention. As yet another example, a user may be hovering over content items 154 using a finger on a touchscreen which obscures some of the content items 154, thereby suggesting inattention to those content items 154. To perform this determination, the user behavior analysis service 121 may refer to the user behavior analysis configuration settings 142 (FIG. 1), the user profile data 136 (FIG. 1), a type of client 106 associated with the user behavior report 130, other user behavior reports 130, and/or other data.

If the user behavior report 130 is associated with user inattention, the user behavior analysis service 121 may exclude the user behavior report 130 from analysis consideration in box 409. The user behavior analysis service 121 then proceeds to box 412. If the user behavior analysis service 121 instead determines in box 406 that the user behavior report 130 is not associated with user inattention, the user behavior analysis service 121 also proceeds to box 412.

In box 412, the user behavior analysis service 121 determines whether another user behavior report 130 is to be obtained before analysis. If so, the user behavior analysis service 121 waits to process additional user behavior reports obtained by the user behavior collection service 118 in box 403. If analysis is to proceed, the user behavior analysis service 121 transitions to box 415. In box 415, the user behavior analysis service 121 analyzes the user behavior reports 130 to identify a user interest or an aggregate user interest in a proper subset of the content items 154 included in one or more network pages 124 (FIG. 1). Thereafter, the portions of the user behavior analysis service 121 and the user behavior collection service 118 end.

Figure 5:
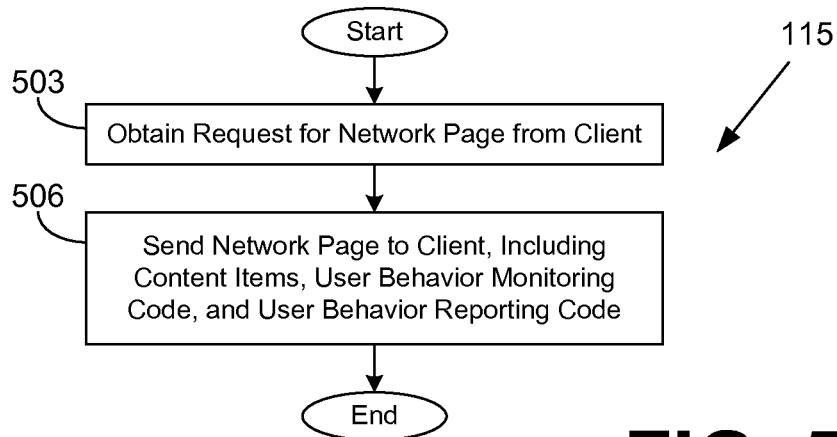
FIG. 5 is a flowchart illustrating one example of functionality implemented as portions of a network page server executed in a computing device in the networked environment of FIG. 1 according to various embodiments of the present disclosure.

Moving on to FIG. 5, shown is a flowchart that provides one example of the operation of a portion of the network page server 115 according to various embodiments. It is understood that the flowchart of FIG. 5 provides merely an example of the many different types of functional arrangements that may be employed to implement the operation of the portion of the network page server 115 as described herein. As an alternative, the flowchart of FIG. 5 may be viewed as depicting an example of steps of a method implemented in the computing device 103 (FIG. 1) according to one or more embodiments.

Beginning with box 503, the network page server 115 obtains a request for a network page 124 (FIG. 1) from a client 106 (FIG. 1) by way of the network 109 (FIG. 1). In box 506, the network page server 115 sends the network page 124 to the client 106. The network page 124 may include content items 154 (FIG. 1), user behavior monitoring code 157 (FIG. 1) and user behavior reporting code 160 (FIG. 1). In some cases, the user behavior monitoring code 157 and/or the user behavior reporting code 160 may correspond to a plug-in or other application which is cached or permanently installed upon the client 106. Thus, the user behavior monitoring code 157 and/or the user behavior reporting code 160 might not be sent by the network page server 115 in response to every request. Thereafter, the portion of the network page server 115 ends.

Figure 6:
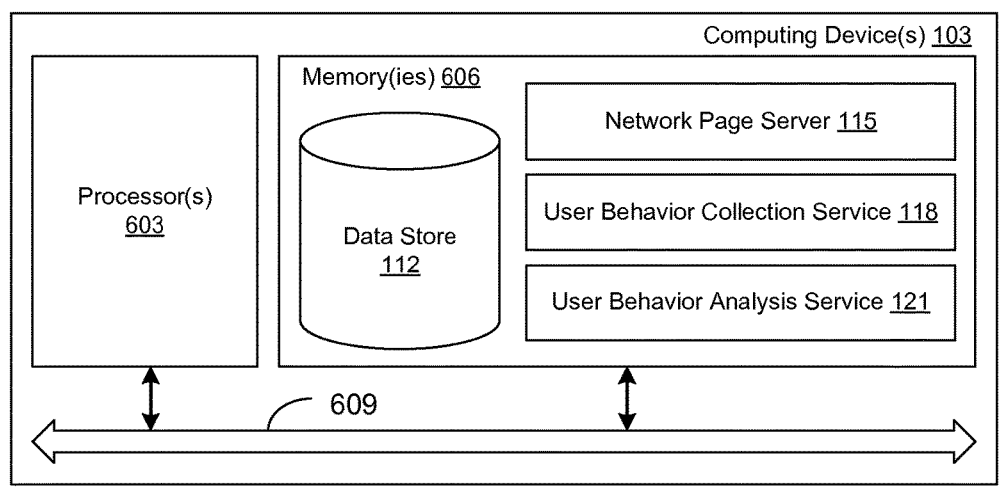
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the network page server 115, the user behavior collection service 118, the user behavior analysis service 121, and potentially other applications. Also stored in the memory 606 may be a data store 112 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the network page server 115, the user behavior collection service 118, the user behavior analysis service 121, the user behavior monitoring code 157 (FIG. 1), the user behavior reporting code 160 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-5 show the functionality and operation of an implementation of portions of the browser 166 (FIG. 1), the user behavior collection service 118, the user behavior analysis service 121, and the network page server 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network page server 115, the user behavior collection service 118, the user behavior analysis service 121, the user behavior monitoring code 157, and the user behavior reporting code 160, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program executable in a first computing device, wherein, when executed, the at least one program causes the first computing device to at least:
  generate a network page, the network page including a plurality of content items to be presented on a rendered version of the network page;
  send the network page to a second computing device;

send user behavior reporting code to the second computing device;
obtain a user behavior report relative to the rendered version of the network page from the second computing device in response to a closure of a window including the rendered version of the network page, the user behavior report being generated by the user behavior reporting code;
estimate a distance between a first location selected by a user on the rendered version of the network page and a second location determined from the user behavior report as the focus of actual user attention on the rendered version of the network page; and
identify a user interest in a proper subset of the content items based at least in part on the user behavior report and the estimated distance.

2. The non-transitory computer-readable medium of claim 1, wherein, when executed, the program further causes the computing device to at least identify the user interest further based at least in part on a type of computing device corresponding to the second computing device.

3. The non-transitory computer-readable medium of claim 1, wherein the user behavior reporting code is configured to cause the second computing device to at least delay reporting the user behavior report to ensure a minimum reporting interval between consecutive reports.

4. The non-transitory computer-readable medium of claim 1, wherein identifying the user interest is further based at least in part upon a display area size associated with the second computing device.

5. The non-transitory computer-readable medium of claim 1, wherein, when executed, the at least one program further causes the first computing device to at least:
obtain a plurality of other user behavior data from a plurality of other computing devices rendering the network page; and
identify an aggregate user interest in the proper subset of the content items based at least in part on the user behavior data from the second computing device, and the plurality of other user behavior data from the plurality of other computing devices.

6. A system comprising:
a data store configured to store content data; and
a first computing device in communication with the data store, the first computing device configured to at least:
generate a network page including a plurality of content items to be presented on a rendered version of the network page;
send the network page to a second computing device;
obtain user behavior data indicating at least one selection location relative to the rendered version of the network page from the second computing device in response to a closure of a window including the rendered version of the network page;
estimate a distance between the at least one selection location on the rendered version of the network page and at least one location of actual user attention on the rendered version of the network page determined from the user behavior data as the focus of actual user attention, the at least one selection location corresponding to a user selection of at least a portion of at least one of the plurality of content items on the rendered version of the network page; and
identify a user interest in a subset of the content items based at least in part on the at least one selection location and the estimated distance.

7. The system of claim 6, wherein the first computing device is further configured to at least identify the user interest further based at least in part on a type of user selection corresponding to the at least one selection location.

8. The system of claim 6, wherein the first computing device is further configured to at least identify the user interest further based at least in part on a type of computing device corresponding to the second computing device.

9. The system of claim 8, wherein the first computing device is further configured to at least identify the user interest further based at least in part on a display area size corresponding to the type of computing device.

10. The system of claim 6, wherein the first computing device is further configured to at least identify the user interest further based at least in part on a browsing habit profile associated with the second computing device.

11. The system of claim 6, wherein the at least one selection location comprises a location of a hovering action.

12. The system of claim 6, wherein the user behavior data includes at least one indication of whether the second computing device is in motion at a particular time, and the first computing device is further configured to at least identify the user interest further based at least in part on whether the second computing device is in motion at the particular time.

13. The system of claim 6, wherein the network page further includes code configured to cause the second computing device to at least:
determine that the second computing device is in motion; and
refrain from reporting the user behavior data based at least in part on determining that the second computing device is in motion.

14. The system of claim 6, wherein the network page further includes code configured to cause the second computing device to at least delay reporting the user behavior data to ensure a minimum reporting interval between consecutive reports.

15. The system of claim 6, wherein the user behavior data includes at least one indication of whether a user of the second computing device is paying attention to the second computing device at a particular time, and the first computing device is further configured to at least identify the user interest further based at least in part on whether the user of the second computing device is paying attention to the second computing device at the particular time.

16. A computer-implemented method comprising:
sending, via at least one first computing device, user behavior monitoring code, user behavior reporting code, and instructions for generating a network page to a plurality of second computing devices, the network page including a plurality of content items to be presented on a rendered version of the network page, the user behavior monitoring code being configured to at least collect user behavior data indicating at least one user action relative to the rendered version of the network page, the user behavior reporting code being configured to at least report the user behavior data to the at least one first computing device according to a predefined time interval;
obtaining, via the at least one first computing device, a plurality of user behavior reports relative to the rendered version of the network page from the plurality of second computing devices in response to a closure of a window of the rendered version of the network page;
for individual user behavior reports of the plurality of user behavior reports, estimating, via the at least one first computing device, a distance between a first location selected by a user on the rendered version of the network page and a second location determined from the individual user behavior report as the focus of actual user attention on the rendered version of the network page; and identifying, via the at least one first computing device, an aggregate user interest in a subset of the plurality of content items based at least in part on the plurality of user behavior reports and the estimated distance for the individual user behavior reports.

17. The computer-implemented method of claim 16, wherein the user behavior reporting code is further configured to at least report the user behavior data to the at least one first computing device in response to determining that the window in which the network page is rendered has closed.

18. The computer-implemented method of claim 16, wherein the user behavior reporting code is further configured to at least refrain from reporting the user behavior data based at least in part on whether a particular second computing device upon which the user behavior monitoring code is executed is determined to be in motion.

19. The computer-implemented method of claim 16, wherein identifying the aggregate user interest further comprises identifying, via the at least one first computing device, the aggregate user interest based at least in part on a corresponding display area size associated with each of the plurality of second computing devices.

20. The computer-implemented method of claim 16, wherein identifying the aggregate user interest further comprises identifying, via the at least one first computing device, the aggregate user interest based at least in part on a corresponding browsing habit profile associated with each of the plurality of second computing devices.

* * * * *